United States Patent
Talbot et al.

(10) Patent No.: US 6,448,815 B1
(45) Date of Patent: Sep. 10, 2002

(54) LOW VOLTAGE DIFFERENTIAL RECEIVER/TRANSMITTER AND CALIBRATION METHOD THEREOF

(75) Inventors: Gerald Talbot, Concord; Michael J. Osborn, Wellesley; Mark D. Hummel, Franklin, all of MA (US)

(73) Assignee: API NetWorks, Inc., Concord, MA (US)

( * ) Notice: Subject to any disclaimer, the term of this patent is extended or adjusted under 35 U.S.C. 154(b) by 0 days.

(21) Appl. No.: 09/699,729

(22) Filed: Oct. 30, 2000

(51) Int. Cl.[7] ............................................... H03K 19/094
(52) U.S. Cl. ............................ 326/86; 326/30; 326/34
(58) Field of Search ............................... 326/30, 34, 83, 326/86

(56) References Cited

U.S. PATENT DOCUMENTS

| | | | | |
|---|---|---|---|---|
| 5,977,796 A | * | 11/1999 | Gabara | 326/86 |
| 6,175,250 B1 | * | 1/2001 | Hedberg | 326/83 |
| 6,222,388 B1 | * | 4/2001 | Bridgewater, Jr. | 326/86 |

* cited by examiner

Primary Examiner—Michael Tokar
Assistant Examiner—Anh Tran
(74) Attorney, Agent, or Firm—Mills & Onello, LLP (57) ABSTRACT

A low-voltage transmitter and receiver adapted for differential signaling via transmission lines between integrated circuits enables operation at very-high data exchange rates. Such data transmission is achieved in a manner that minimizes reflected energy and minimizes crosstalk between signals propagating over neighboring transmission lines. In achieving optimal transmission characteristics, a bridge circuit is employed to drive the signal. The bridge circuit is connected in series between a pull-up and pull-down resistance, their respective resistance values being programmable to maintain optimal communication rates and quality. The pull-up and pull-down resistors preferably comprise a bank of transistors having source-to-drain resistance values that are binary multiples of each other. The transistors are preferably coupled in parallel with each other and in parallel with a resistor, such that the transistors can be selectively activated by a binary voltage control data word. By activating different transistors in the network, different overall resistance values can be achieved. A calibration circuit is provided for periodic calibration of the resistance values to maintain optimal operation with varying system supply voltage and temperature.

47 Claims, 3 Drawing Sheets

LOW VOLTAGE DIFFERENTIAL RECEIVER/ TRANSMITTER AND CALIBRATION METHOD THEREOF

BACKGROUND OF THE INVENTION

Differential signaling is commonly used for communication of data between multiple integrated circuits mounted to a common printed circuit board, and between integrated circuits mounted to separate printed circuit boards coupled to a common backplane. A transmission line formed on the printed circuit board or backplane serves as the data communication interface.

Differential signals carried by the transmission line exhibit multiple transmission modes, for example even and odd modes of signal propagation. As transmission rates increase, these modes become higher order. As a result, the adverse effects of reflection and crosstalk begin to affect signal transmission. It is a common objective in such data communication systems to be able to drive and receive the data signals at high transmission rates, while minimizing reflected energy in the system and minimizing crosstalk between signals of neighboring transmission lines.

SUMMARY OF THE INVENTION

The present invention relates to a low-voltage transmitter and receiver adapted for differential signaling via transmission lines between integrated circuits at very-high data exchange rates. Such transmission is achieved in a manner that minimizes reflected energy and minimizes crosstalk between signals propagating over neighboring transmission lines.

In achieving optimal transmission characteristics, a bridge circuit is employed to drive the signal. The bridge circuit is connected in series between a pull-up and pull-down resistance, the resistance values being programmable to maintain optimal communication rates and quality.

The pull-up and pull-down resistors preferably comprise a bank of transistors having source-to-drain resistance values that are binary multiples of each other. The transistors are preferably coupled in parallel with each other and in parallel with a resistor, such that the transistors can be selectively activated by a binary voltage-control data word. By activating different transistors in the network, different overall resistance values can be achieved.

A receiver resistor is applied at the receiver end of the communication channel between the first and second differential signal components, across the inputs to a receiver comparator which converts the received differential signal to a standard binary signal at a voltage compatible with the system voltage. The receiver resistor preferably also comprises a programmable resistor network, as described above.

In a first embodiment, the present invention comprises a differential data communication system. The system comprises a differential driver for generating a differential data signal from a binary data signal, the differential data signal being adapted for transmission over a communication medium. A pull-up resistor is coupled between the differential driver and a first voltage source for controlling an upper voltage level of the differential data signal. A pull-down resistor is coupled between the differential driver and a second voltage source for controlling a lower voltage level of the differential data signal. The pull-up and pull-down resistors have variable resistance values that are programmable for maintaining the upper and lower voltage levels for optimal data transmission of the differential data signal by the differential driver over the communication medium.

In a preferred embodiment, the first voltage source comprises a supply voltage, and the second voltage source comprises a ground voltage.

The pull-up and pull-down resistors each preferably comprise a plurality of transistors in parallel between first and second resistor terminals, the transistors being of different sizes such that their respective source-to-drain resistance values are different when activated. A parallel resistor is preferably coupled in parallel with the plurality of transistors. The respective source-to-drain resistance values of the transistors are preferably substantially binary multiples of each other. The transistors are preferably activated by a binary selection signal, the bits of which are coupled to respective gates of the transistors. The binary selection signal can be determined by a calibration circuit.

The system may further comprise a receiver comprising a differential comparator and a receiver resistor coupled between first and second inputs to the comparator, the receiver being coupled to the communication medium for receiving the differential data signal and for converting the differential data signal to a binary data signal. The receiver resistor preferably comprises a plurality of transistors in parallel between first and second resistor terminals, the transistors being of different sizes such that their respective source-to-drain resistance values are different when activated, a plurality of first bidirectional series resistors between each transistor and the first resistor terminal, and a plurality of second bidirectional resistors between each transistor and the second resistor terminal. A parallel resistor may be coupled in parallel with the plurality of transistors. The respective source-to-drain resistance values of the transistors are preferably substantially binary multiples of each other. The transistors may be activated by a binary selection signal, the bits of which are coupled to respective gates of the transistors. The binary selection signal may be determined by a calibration circuit.

To further achieve optimal transmission characteristics, a calibration circuit and method are provided. The calibration system is formed on the same integrated circuit as the differential driver and receiver pair, and includes a clone of the programmable resistor networks used by the driver and receiver. Accordingly, control values for the resistor networks can be determined and continually updated during operation of the device, while minimizing the effects of variability in fabrication of the devices, supply voltage, and operating temperature.

By integrating transmitter and receiver resistors on a common chip, package parasitic inductance and capacitance effects are avoided that would otherwise introduce distortion and reflection into the signal.

In this manner, a double-terminated transmission medium is realized, having a transmitter output impedance and a receiver output impedance equal to the differential impedance $Z_0$ of the transmission line.

In a second embodiment, the present invention is directed to a calibration circuit for a differential data communication system including a differential driver having a variable pull-up resistor and pull-down resistor and a differential receiver having a variable receive termination resistor. The calibration circuit includes a calibration pull-up resistor and a calibration pull-down resistor in series between a first and second voltage source. A calibration receive termination resistor is in series between the calibration pull-up and pull down resistors. Each of the calibration pull-up and pull-down resistors and the calibration receive termination resistor comprise a bank of calibration transistors in parallel with each other, the calibration transistors of a common bank being of different sizes such that their respective source-to-drain values are different when activated. The calibration transistors are selectively activated by binary selection signals, the bits of which are applied to the respective gates of the transistors. The calibration receive termination resistor further includes bidirectional series resistors in series with the calibration transistors of that bank. An optimizing circuit determines optimal binary selection signals for the calibration pull-up resistor, calibration pull-down resistor, and calibration receive termination resistor.

The differential driver, differential receiver, and calibration circuit all preferably reside on a common integrated circuit. A series resistor bank may be provided between the first and second voltage sources for providing first and second reference voltages, the first and second fixed reference voltages in turn being provided to one of the positive and negative inputs of first and second respective comparators. In this case, a first variable reference voltage may be provided at the interface of the calibration pull-up resistor and a first terminal of the calibration receive termination resistor, and a second variable reference voltage may be provided at the interface of the calibration pull-down resistor and a second terminal of the calibration receive termination resistor, the first and second variable reference voltages being provided to the other of the positive and negative inputs of the first and second comparators.

The binary selection signals of the calibration pull-up transistor, calibration pull-down transistor, and calibration receive termination resistor are preferably optimized by applying the binary selection signals to the respective transistor banks, and by monitoring the comparator outputs, such that the first and second variable reference voltages substantially match the first and second fixed reference voltages. The binary selection signals are preferably adjusted incrementally, during optimization, based on the comparator outputs, for example, by increments of a single binary bit.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

The present invention relates to a low-voltage transmitter and receiver adapted for differential signaling between integrated circuits via transmission lines at very-high data exchange rates. Such transmission is achieved in a manner that minimizes reflected energy and minimizes crosstalk between signals propagating over neighboring transmission lines by correct line termination in the transmitter and receiver.

Figure 1:
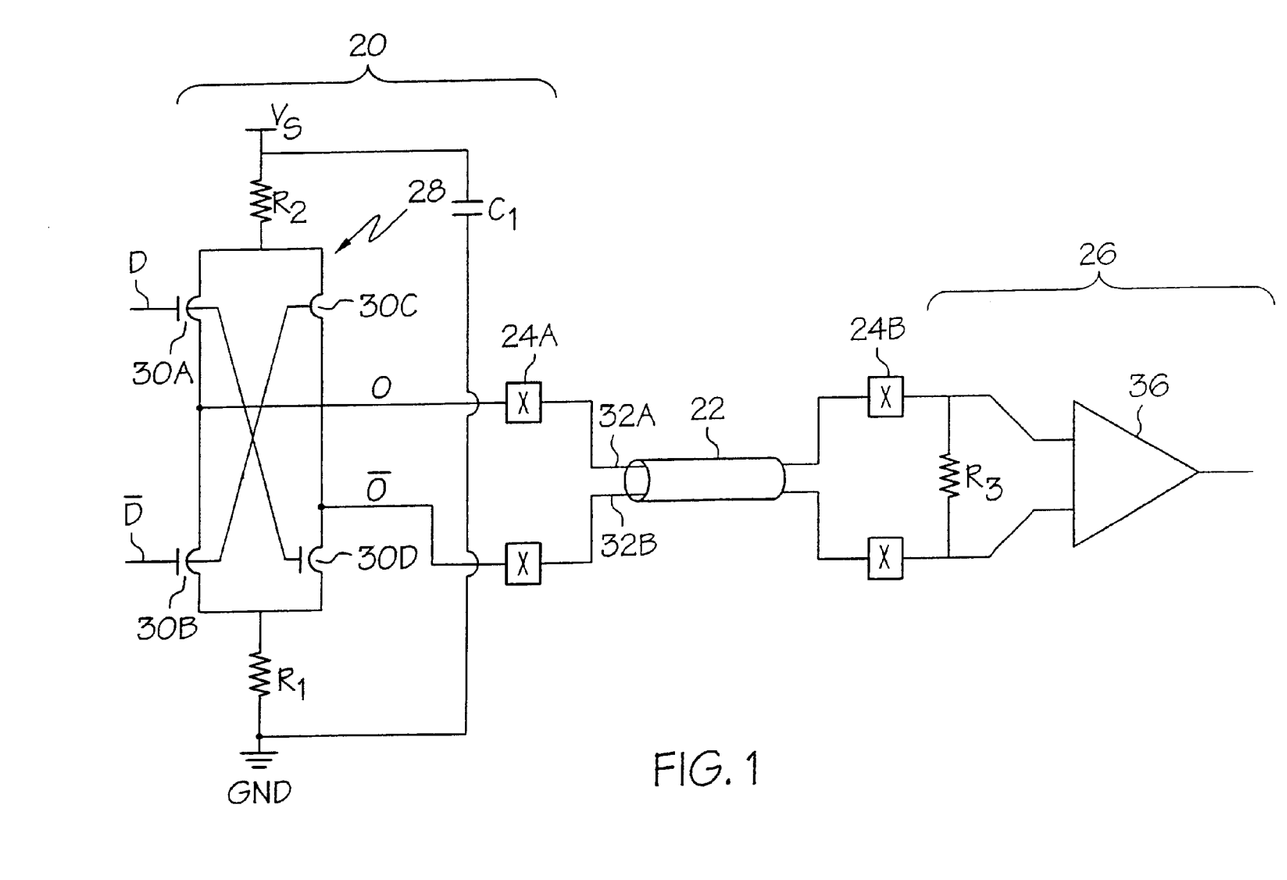
FIG. 1 is a schematic diagram of a differential signal driver and receiver coupled to a transmission line, in accordance with the present invention.

With reference to FIG. 1, the transmission system comprises a driver 20, a transmission medium 22, and a receiver 26. The driver 20 and receiver 26 may be located on separate integrated circuits mounted to a common printed circuit board, or otherwise may be located on separate integrated circuits mounted to different printed circuit boards coupled to a common backplane including the transmission medium 22 via optional connectors 24A, 24B.

The transmission medium 22 may comprise, for example, a wire interconnect formed on a printed circuit board, or embedded in a cable or other transmission vehicle. The wire interconnect may comprise first and second wires 32A, 32B, forming a wire pair for communicating first and second portions of the differential signal.

In achieving optimal transmission characteristics, a bridge circuit 28 is employed to drive the signal. The bridge circuit preferably comprises a steering network including four n-channel transistors 30A, 30B, 30C, 30D which are driven by complementary data bits D, D'. The bridge circuit 28 receives the complementary data bits from the driving circuit, and in turn provides a complementary differential output signal O, O' to be transferred across the transmission line 22 to the receiver 26.

Control over the voltage level of the output signal O, O' is critical to transmission performance. Accordingly, the impedance of the driver 20 should be matched to that of the transmission line to absorb signal reflections in the system and backward crosstalk, and the voltage levels provided to the transmission line should be controlled to ensure operation within a controlled voltage range. To accomplish this, first and second resistors $R_1$ $R_2$ are coupled between the transistors 30A–D of the bridge circuit 28 and a ground GND ($R_1$), and coupled between the bridge circuit 28 and a supply voltage $V_S$ ($R_2$). The resistances of resistors $R_1$, $R_2$ are designed to match the common mode, or even mode, impedance of the transmission line 22. Typical transmission line impedances range between 45 and 65 ohms. By matching the differential and common-mode impedances, reflected energy from the load in the receiver 26, or "backward crosstalk", is absorbed in the transmitter, then reflected back to the receiver, where it can interfere with the received data pattern. Capacitor C1, included on the chip, ensures that the high-frequency signals are decoupled between $V_S$ and ground. $R_1$ and $R_2$ therefore serve to terminate the transmission line for its odd-mode impedance. Accordingly, the transmitter 20 absorbs both common-mode and differential energy reflected by the receiver, or generated by crosstalk.

In the receiver 26, a third resistor $R_3$ is provided to match the odd-mode impedance of the transmission line. The third resistor $R_3$ is coupled between the first and second lines of the pair as shown, at the input of a differential comparator 36 provided in the receiver 26 for converting the received complementary signal to a unitary binary input signal for use by the receiving circuit. According to appropriate transmission line geometries, a typical value of the resistance of resistor $R_3$ is on the order of 100 ohms.

A number of conventional techniques, including the well-known low-voltage differential signaling (LVDS) standard, allow for transmission and reception of differential signals between circuits across a transmission medium. However, such techniques employ current sources for sourcing and sinking current to the transistors 30A–30D. Such current sources create a high AC impedance from the transmitter and so energy will be reflected instead of absorbed. Additionally, current sources generally require a relatively high source voltage $V_S$, for example approximately 2.5 Volts minimum, for proper operation.

In contrast the present invention provides for deliberate adjustment of resistors $R_{1\ and\ R2}$ to match the impedance of the transmission lines, thereby absorbing energy reflected back from the load, i.e. the receiver 26. The voltage source level $V_S$ is selected to be at a low voltage, for example 1 volt, so as to create a small voltage swing across resistor $R_3$. This translates to approximately 0.5 volts across resistors $R_1$ and $R_2$.

In a CMOS process it is difficult to accurately control resistor values for resistors created by layout of bulk material on the substrate. For this reason, the resistors $R_1$, $R_2$, and $R_3$ are preferably implemented using switched resistor networks that allow for variable control of the resistance values.

Figure 2:
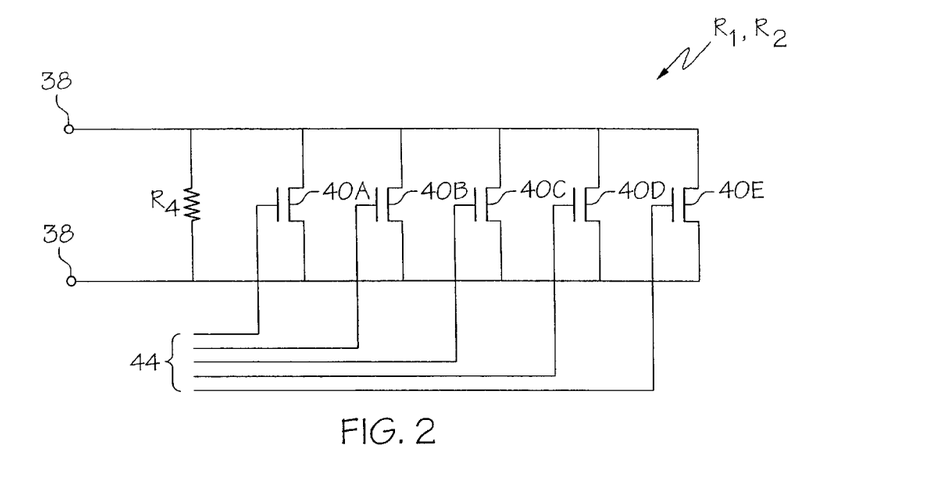
FIG. 2 is a schematic diagram of a switched resistor network illustrating a preferred embodiment of the variable resistors $R_1$, $R_2$ of the driver of FIG. 1, in accordance with the present invention.

FIG. 2 is a schematic diagram of a switched resistor network illustrating a preferred embodiment of the variable resistors $R_1$, $R_2$ of the driver 20 of FIG. 1. The network includes a shunt resistor $R_4$ of a resistance value equal to the maximum anticipated resistance value required. A plurality of transistors 40A, 40B . . . 40E are configured in parallel with the shunt resistor $R_4$. The transistors are preferably formed of different and decreasing sizes, so as to have corresponding decreasing source-to-drain resistance values. In a preferred embodiment, the transistors are chosen so as to have resistance values that are binary multiples of each other, and of the shunt resistor. For example, shunt resistor $R_4$ may be fabricated on the integrated circuit driver device to have a resistance value of 64 ohms, while transistors 40A–40E may be fabricated to have scaled resistance values of 16, 8, 4, 2, and 1 ohms respectively when activated. The transistors are selectively activated by a binary control signal 44 coupled to the transistor gates as shown to provide for selective control over the resulting network resistance values. In this manner, a binary-weighted resistance value is achieved between terminals 38, for example a resistance value incrementally ranging between 0.512 and 64 ohms, depending on the value of the binary control signal.

On the receiver end, currents passing through resistor $R_3$ are bidirectional, owing to the received differential signal. For this reason, the switched resistor network for the preferred embodiment of resistor $R_3$ is modified according to the configuration of FIG. 3. With reference to FIG. 4, which is a simplified model of the FIG. 3 embodiment, voltage waveforms are symmetrical about the dashed center line 90. This ensures that transistor M1 operates symmetrically with the same back bias potential, regardless of which terminal is most positive. If the circuit was asymmetrical, for example by omitting, or shorting out, resistor $R_x$, then transistor M1 would have a different Vgs and Vbb, depending on which input signal was most positive. Modulating Vgs and Vbb in this manner would cause a corresponding change in the on-resistance, and the non-linear termination resistance that would distort the input waveform, and cause more energy to be reflected back from the receiver. To avoid this problem, the bidirectional embodiment of FIG. 3 includes series resistors $R_{7A}$–$R_{10A}$ and $R_{7B}$–$R_{10B}$ on either side of transistors 42A–42E, the series resistor/transistor grouping in turn being configured in parallel with each other, as shown, and coupled in series with resistors $R_{5A}$–$R_{5B}$.

Each integrated circuit in a system employing bidirectional data transmission according to the present invention preferably includes both a transmitter 20 and receiver 26 circuits. Because fabrication processes can vary, as well as the characteristics of the transmission lines coupled between circuits, it is desirable to calibrate the resistance values of resistors $R_1$, $R_2$, and $R_3$ accordingly. In view of this, the present invention further provides a calibration system and method for calibrating the resistance values for optimum transmission characteristics.

Figure 3:
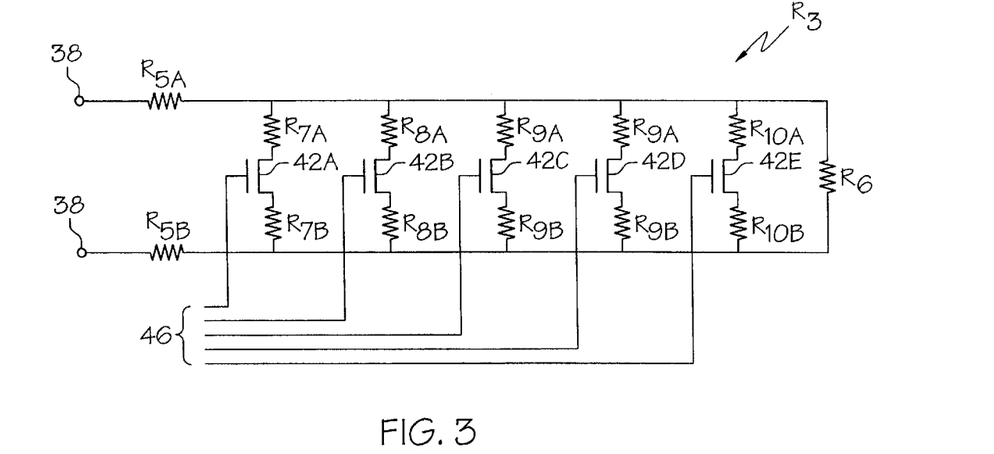
FIG. 3 is a schematic diagram of a switched resistor network illustrating a preferred embodiment of the variable resistor $R_3$ of the receiver of FIG. 1, in accordance with the present invention.
Figure 4:
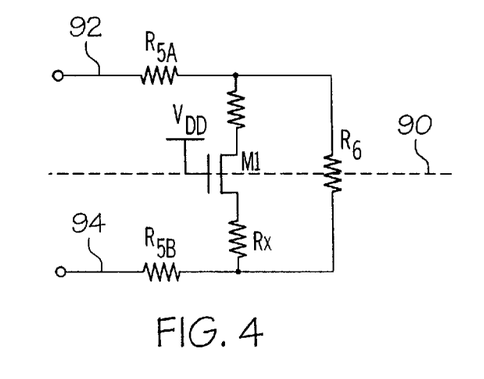
FIG. 4 is a schematic diagram of a model calibration circuit, in accordance with the present invention.

The calibrator provides a means for calculating the binary values 44 of the transmission pull-up and pull-down resistor networks R2 and R1 of FIG. 2, and the binary values 46 of the receiver resistor network R3 of FIG. 3. The binary values are adjusted to compensate for variances in device fabrication process, voltage and temperature (PVT). A calibration circuit theoretically emulates the characteristics of the driver, receiver, and transmission line, as shown in FIG. 4, for determining the appropriate binary control signals for programming the resistance values of the various resistor banks.

Figure 5:
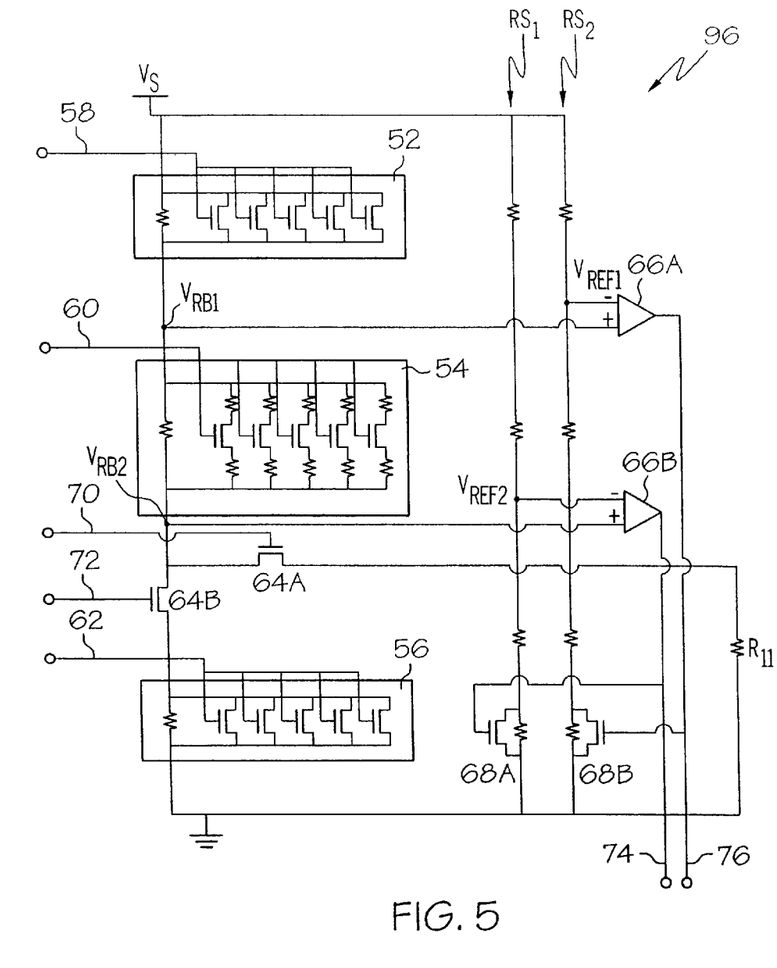
FIG. 5 is a schematic diagram of a calibrator circuit which requires a single external pin for periodic calibration of three switched resistor networks of FIGS. 2 and 3 during operation of the communication device, in accordance with the present invention.

The calibration circuit of FIG. 5 includes a pull-up resistor bank 52 emulating the behavior of resistor $R_2$ of the driver 20 of FIG. 1, a pull-down resistor bank 56 emulating the behavior of resistor $R_1$ of the driver 20, and a receiver resistor bank 54 emulating the behavior of resistor $R_3$ of the receiver 24 of FIG. 1. The calibration network is preferably formed on the same integrated circuit as the corresponding receiver and driver circuits to emulate the behavior of the receiver and driver, and for programming their resistance values $R_1$, $R_2$, and $R_3$ accordingly. Since the calibration network is formed on the same chip as the receiver and driver circuits, the fabrication process is nearly identical for all components on the chip, including the actual resistor networks used in the receiver and transmitter, and their clones in the calibration network. Accordingly, variability in fabrication process is removed from the calibration. Similarly, the temperature and voltage variables are also accounted for, since the actual components and their calibration clones are subjected to nearly identical temperatures and voltages.

In a preferred embodiment, the calibrator operates periodically and continuously during system operation to update the programmed resistance values to maintain optimum performance in data communication. With reference to FIG. 5, a preferred embodiment of the calibration circuit 96 is comprised of first and second series resistor networks $RS_1$, $RS_2$, and three resistor banks 52, 54, 56, identical to those used for the receive termination resistor $R_3$, and the transmit pull-up and pull-down resistors $R_1$, $R_2$. The series resistor networks $RS_1$, $RS_2$, generate reference voltages Vref1, Vref2 that are provided to the negative inputs of first and second voltage comparators 66A, 66B, while the resistor banks 52, 54, 56 generate reference voltages Vrb1, Vrb2 that are provided to the positive inputs of the comparators 66A, 66B. The resistor banks 52, 54, 56 are arranged such that when the control signal 70 from an associated calibration state machine is asserted, banks 52 and 54, and an external resistor $R_1$, are in series, and provide reference voltages Vrb1 and Vrb2 to the comparators, allowing for calibration of resistor banks 52 and 54. When control signal 72 from the state machine is instead asserted, resistor banks 52 and 54, and the transmit pull-down resistor bank 56 are in series, allowing for the calibration of the pull-down resistor bank 56. The outputs 74, 76 of the comparators 66A, 66B are then used by the calibration state machine to identify whether an ideal setting has been achieved for the bank.

Each series resistor bank $RS_1$, $RS_2$ has a resistor that may be shorted via a parallel transistor 68A, 68B when the comparator for that bank has triggered. This serves to drop the negative reference voltage to the comparator by, for example 1%, creating hysteresis for the circuit, and making the output stable for detection by the calibration state machine.

In a preferred embodiment, the state machine operation begins by setting the binary value 25 of the five-bit control lines 58, 60 to achieve maximum impedance in the banks 52, 54, respectively, for example using a binary value of 0, The resistance of the transmit pull-up bank 52 is then stepped downwardly by increasing the control line 58 binary value until comparator output signal 76 is asserted. Next, the resistance of the receiver bank 54 is reduced by increasing the control line 60 binary value until comparator output signal 74 is asserted. This process is repeated for a number of iterations until optimal values for the control lines 50, 60 are reached. Assuming the control line values reach their maximum during the optimization procedure without causing a transition of comparator output signals 74 and 76, then the maximum values are used for the calibration, corresponding to a minimum resistance value for transmitter pull-up and receiver resistor banks 52 and 54.

Following optimization of the control values for banks 52 and 54, the calibration procedure continues by calibrating the control value 62 for the transmitter pull-down resistor bank 56. As an example, the control value may start at a maximum binary value, corresponding to a minimum resistance value, that is decremented until comparator output signal 74 is asserted, or until the maximum resistance value (minimum control signal value) is reached.

Following determination of the set of optimum values for control signals 58, 60, 62, these values are presented to the input/output cells of the integrated circuit. These values are preferably periodically re-calculated and update. During operation, large swings in the receive and transmit impedance values can be avoided, or otherwise filtered, by permitting only small, incremental adjustments in the control signal values, for example in increments of one. A filter can also be implemented to average new control signal values over a sample window, for example sixteen samples, to eliminate erroneous updates values caused by resident noise in the calibrator circuit. In a preferred embodiment, the first sample values generated by the calibrator circuit are used to immediately load the IO cells, and to seed the initial filter values. This ensures that reasonable impedance values will be present during early IO signaling, eliminating the possibility of a long ramp-up time, caused by the filtering mechanism, before optimal operation.

While this invention has been particularly shown and described with reference to preferred embodiments thereof, it will be understood by those skilled in the art that various changes in form and detail may be made herein without departing from the spirit and scope of the invention as defined by the appended claims.

What is claimed is:

1. A differential data communication system comprising:
    a differential driver for generating a differential data signal from a binary data signal, said differential data signal for transmission over a communication medium;
    a pull-up resistor coupled between said differential driver and a first voltage source for controlling an upper voltage level of said differential data signal; and
    a pull-down resistor coupled between said differential driver and a second voltage source for controlling a lower voltage level of said differential data signal;
    wherein said pull-up and pull-down resistors have variable resistance values that are programmable to respectively vary a first voltage difference across the pull-up resistor and a second voltage difference across the pull-down resistor, the first voltage difference and the second voltage difference controlling the upper voltage level and the lower voltage level of the differential data signal respectively, for maintaining said upper and lower voltage levels for optimal data transmission of said differential data signal by said differential driver over said communication medium.

2. The differential data communication system of claim 1 wherein the first voltage source comprises a supply voltage.

3. The differential data communication system of claim 1 wherein the second voltage source comprises a ground voltage.

4. The differential data communication system of claim 1 wherein said pull-up and pull-down resistors each comprise a plurality of transistors in parallel between first and second resistor terminals, the transistors being of different sizes such that their respective source-to-drain resistance values are different when activated.

5. The differential data communication system of claim 4 further comprising a parallel resistor in parallel with said plurality of transistors.

6. The differential data communication system of claim 4 wherein the respective source-to-drain resistance values are substantially multiples of each other.

7. The differential data communication system of claim 4 wherein the transistors are activated by a binary selection signal, the bits of which are applied to respective gates of the transistors.

8. The differential data communication system of claim 7 wherein the binary selection signal is determined by a calibration circuit comprising:
    a calibration pull-up resistor and a calibration pull-down resistor in series between the first voltage source and the second voltage source, each of the calibration pull-up and pull-down resistors comprising a plurality of calibration transistors in parallel between first and second calibration resistor terminals, the calibration transistors being selectively activated by binary selection signals, the bits of which are applied to the respective gates of the transistors; and
    a transmitter optimizing circuit for determining optimal binary selection signals for the calibration pull-up resistor and the calibration pull-down resistor.

9. The differential data communication system of claim 8 wherein the transmitter optimizing circuit determines the optimal binary selection signals periodically, during operation, and applies the updated optimal binary selection signals to the respective gates of the transistors of the pull-up and pull-down resistors.

10. The differential data communication system of claim 8 wherein the calibration circuit further comprises a calibration receive termination resistor, in series between the calibration pull-up and calibration pull-down resistors, the calibration receive termination resistor comprising:
    a plurality of calibration transistors in parallel between first and second calibration resistor terminals, the calibration transistors being of different sizes such that their respective source-to-drain values are different when activated;
    a plurality of first bidirectional series resistors between each transistor and the first calibration resistor terminal, and a plurality of second bidirectional series resistors between each transistor and the second calibration resistor terminal, the calibration transistors being selectively activated by binary selection signals, the bits of which are applied to the respective gates of the transistors; and a receiver optimizing circuit for determining optimal binary selection signals for the calibration receive termination resistor.

11. The differential data communication system of claim 10 wherein the differential driver, pull-up resistor, pull-down resistor, and calibration circuit reside on a common integrated circuit.

12. The differential data communication system of claim 1 further comprising a differential receiver comprising a differential comparator and a receiver resistor coupled between first and second inputs to the comparator, said receiver coupled to the communication medium for receiving the differential data signal and for converting the differential data signal to a binary data signal.

13. The differential data communication system of claim 12 wherein the receiver resistor comprises a plurality of receiver transistors in parallel between first and second resistor terminals, the receiver transistors being of different sizes such that their respective source-to-drain resistance values are different when activated, a plurality of first bidirectional series resistors between each receiver transistor and the first resistor terminal and a plurality of second bidirectional resistors between each transistor and the second resistor terminal.

14. The differential data communication system of claim 13 further comprising a parallel resistor in parallel with said plurality of receiver transistors.

15. The differential data communication system of claim 13 wherein the respective source-to-drain resistance values of the receiver transistors are substantially multiples of each other.

16. The differential data communication system of claim 13 wherein the receiver transistors are activated by a binary selection signal, the bits of which are applied to respective gates of the receiver transistors.

17. The differential data communication system of claim 16 wherein the binary selection signal is determined by a calibration circuit comprising a calibration receive termination resistor comprising:

a plurality of calibration receive termination transistors in parallel between first and second calibration resistor terminals, the calibration receive termination transistors being of different sizes such that their respective source-to-drain values are different when activated;

a plurality of first bidirectional series resistors between each calibration receive termination transistor and the first calibration resistor terminal, and a plurality of second bidirectional series resistors between each calibration receive termination transistor and the second calibration resistor terminal, the calibration receive termination transistors being selectively activated by binary selection signals, the bits of which are applied to the respective gates of the transistors; and a receiver optimizing circuit for determining optimal binary selection signals for the calibration receive termination resistor.

18. The differential data communication system of claim 17 wherein the receiver optimizing circuit determines the optimal binary selection signals periodically, during operation, and applies the updated optimal binary selection signals to the respective gates of the transistors of the receiver termination resistor.

19. The differential data communication system of claim 17 wherein the calibration circuit further comprises:

a calibration pull-up resistor and a calibration pull-down resistor in series with the calibration receive termination resistor between the first voltage source and second voltage source, each of the calibration pull-up and pull-down resistors comprising a plurality of calibration transistors in parallel between first and second calibration resistor terminals, the calibration transistors being selectively activated by binary selection signals, the bits of which are applied to the respective gates of the transistors; and a transmitter optimizing circuit for determining optimal binary selection signals for the calibration pull-up resistor and the calibration pull-down resistor.

20. The differential data communication system of claim 19 wherein the differential driver, differential receiver, pull-up resistor, pull-down resistor, receiver resistor, and calibration circuit reside on a common integrated circuit.

21. The differential data communication system of claim 1 wherein the differential driver comprises a steering network.

22. A calibration circuit for a differential data communication system including a differential driver having a variable pull-up resistor and pull-down resistor and a differential receiver having a variable receive termination resistor comprising:

a calibration pull-up resistor and a calibration pull-down resistor in series between a first and second voltage source;

a calibration receive termination resistor in series with the calibration pull-up and pull down resistors;

each of the calibration pull-up and pull-down resistors and the calibration receive termination resistor comprising a bank of calibration transistors in parallel with each other, the calibration transistors of a common bank being of different sizes such that their respective source-to-drain values are different when activated; the calibration transistors being selectively activated by binary selection signals, the bits of which are applied to the respective gates of the transistors, wherein the calibration receive termination resistor further includes bidirectional series resistors in series with the calibration transistors of that bank; and an optimizing circuit for determining optimal binary selection signals for the calibration pull-up resistor, calibration pull-down resistor, and calibration receive termination resistor.

23. The calibration circuit of claim 22 wherein the differential driver, differential receiver, and calibration circuit all reside on a common integrated circuit.

24. The calibration circuit of claim 22 further comprising a series resistor bank between the first and second voltage sources for providing first and second reference voltages, the first and second fixed reference voltages in turn being provided to one of the positive and negative inputs of first and second respective comparators.

25. The calibration circuit of claim 24 wherein a first variable reference voltage is provided at the interface of the calibration pull-up resistor and a first terminal of the calibration receive termination resistor, and wherein a second variable reference voltage is provided at the interface of the calibration pull-down resistor and a second terminal of the calibration receive termination resistor, the first and second variable reference voltages being provided to the other of the positive and negative inputs of the first and second comparators.

26. The calibration circuit of claim 25 wherein the binary selection signals of the calibration pull-up transistor, calibration pull-down transistor, and calibration receive termination resistor are optimized by applying the binary selection signals to the respective transistor banks, and by monitoring the comparator outputs, such that the first and second variable reference voltages substantially match the first and second fixed reference voltages.

27. The calibration circuit of claim 26 wherein the binary selection signals are adjusted incrementally, during optimization, based on the comparator outputs.

28. The calibration circuit of claim 26 wherein the incremental adjustment is by increments of a single binary bit.

29. A differential data communication system comprising:
    a differential driver for generating a differential data signal from a binary data signal, said differential data signal for transmission over a communication medium;
    a pull-up resistor coupled between said differential driver and a first voltage source for controlling an upper voltage level of said differential data signal;
    a pull-down resistor coupled between said differential driver and a second voltage source for controlling a lower voltage level of said differential data signal;
    wherein said pull-up and pull-down resistors have variable resistance values that are programmable for maintaining said upper and lower voltage levels for optimal data transmission of said differential data signal by said differential driver over said communication medium; and
    a differential receiver comprising a differential comparator and a receiver resistor coupled between first and second inputs to the comparator, said receiver coupled to the communication medium for receiving the differential data signal and for converting the differential data signal to a binary data signal
    wherein the receiver resistor comprises a plurality of receiver transistors in parallel between first and second resistor terminals, the receiver transistors being of different sizes such that their respective source-to-drain resistance values are different when activated, a plurality of first bidirectional series resistors between each receiver transistor and the first resistor terminal and a plurality of second bidirectional resistors between each receiver transistor and the second resistor terminal.

30. The differential data communication system of claim 29 further comprising a parallel resistor in parallel with said plurality of receiver transistors.

31. The differential data communication system of claim 29 wherein the respective source-to-drain resistance values of the receiver transistors are substantially multiples of each other.

32. The differential data communication system of claim 29 wherein the receiver transistors are activated by a binary selection signal, the bits of which are applied to respective gates of the receiver transistors.

33. The differential data communication system of claim 32 wherein the binary selection signal is determined by a calibration circuit comprising a calibration receive termination resistor comprising:
    a plurality of calibration receive termination transistors in parallel between first and second calibration resistor terminals, the calibration receive termination transistors being of different sizes such that their respective source-to-drain values are different when activated;
    a plurality of first bidirectional series resistors between each calibration receive termination transistor and the first calibration resistor terminal, and a plurality of second bidirectional series resistors between each calibration receive termination transistor and the second calibration resistor terminal,
    the calibration receive termination transistors being selectively activated by binary selection signals, the bits of which are applied to the respective gates of the transistors; and
    a receiver optimizing circuit for determining optimal binary selection signals for the calibration receive termination resistor.

34. The differential data communication system of claim 33 wherein the receiver optimizing circuit determines the optimal binary selection signals periodically, during operation, and applies the updated optimal binary selection signals to the respective gates of the transistors of the receiver termination resistor.

35. The differential data communication system of claim 33 wherein the calibration circuit further comprises:
    a calibration pull-up resistor and a calibration pull-down resistor in series with the calibration receive termination resistor between the first voltage source and second voltage source, each of the calibration pull-up and pull-down resistors comprising a plurality of calibration transistors in parallel between first and second calibration resistor terminals, the calibration transistors being selectively activated by binary selection signals, the bits of which are applied to the respective gates of the transistors; and
    a transmitter optimizing circuit for determining optimal binary selection signals for the calibration pull-up resistor and the calibration pull-down resistor.

36. The differential data communication system of claim 33 wherein the differential driver, differential receiver, pull-up resistor, pull-down resistor, receiver resistor, and calibration circuit reside on a common integrated circuit.

37. The differential data communication system of claim 29 wherein the differential driver comprises a steering network.

38. The differential data communication system of claim 29 wherein the first voltage source comprises a supply voltage.

39. The differential data communication system of claim 29 wherein the second voltage source comprises a ground voltage.

40. The differential data communication system of claim 29 wherein said pull-up and pull-down resistors each comprise a plurality of pull-up and pull-down transistors respectively in parallel between first and second resistor terminals, the pull-up and pull-down transistors being of different sizes such that their respective source-to-drain resistance values are different when activated.

41. The differential data communication system of claim 40 further comprising a parallel resistor in parallel with said plurality of pull-up and pull-down transistors.

42. The differential data communication system of claim 40 wherein the respective source-to-drain resistance values are substantially multiples of each other.

43. The differential data communication system of claim 40 wherein the pull-up and pull-down transistors are activated by a binary selection signal, the bits of which are applied to respective gates of the pull-up and pull-down transistors.

44. The differential data communication system of claim 43 wherein the binary selection signal is determined by a calibration circuit comprising:

a calibration pull-up resistor and a calibration pull-down resistor in series between the first voltage source and the second voltage source, each of the calibration pull-up and pull-down resistors comprising a plurality of calibration transistors in parallel between first and second calibration resistor terminals, the calibration transistors being selectively activated by binary selection signals, the bits of which are applied to the respective gates of the transistors; and a transmitter optimizing circuit for determining optimal binary selection signals for the calibration pull-up resistor and the calibration pull-down resistor.

45. The differential data communication system of claim 44 wherein the transmitter optimizing circuit determines the optimal binary selection signals periodically, during operation, and applies the updated optimal binary selection signals to the respective gates of the transistors of the pull-up and pull-down resistors.

46. The differential data communication system of claim 44 wherein the calibration circuit further comprises a calibration receive termination resistor, in series between the calibration pull-up and calibration pull-down resistors, the calibration receive termination resistor comprising:

a plurality of calibration transistors in parallel between first and second calibration resistor terminals, the calibration transistors being of different sizes such that their respective source-to-drain values are different when activated;

a plurality of first bidirectional series resistors between each calibration transistor and the first calibration resistor terminal, and a plurality of second bidirectional series resistors between each calibration transistor and the second calibration resistor terminal, the calibration transistors being selectively activated by binary selection signals, the bits of which are applied to the respective gates of the transistors; and a receiver optimizing circuit for determining optimal binary selection signals for the calibration receive termination resistor.

47. The differential data communication system of claim 46 wherein the differential driver, pull-up resistor, pull-down resistor, and calibration circuit reside on a common integrated circuit.

* * * * *